May 28, 1935.  J. H. CLARK  2,003,173
FLUID VALVE
Filed March 14, 1933
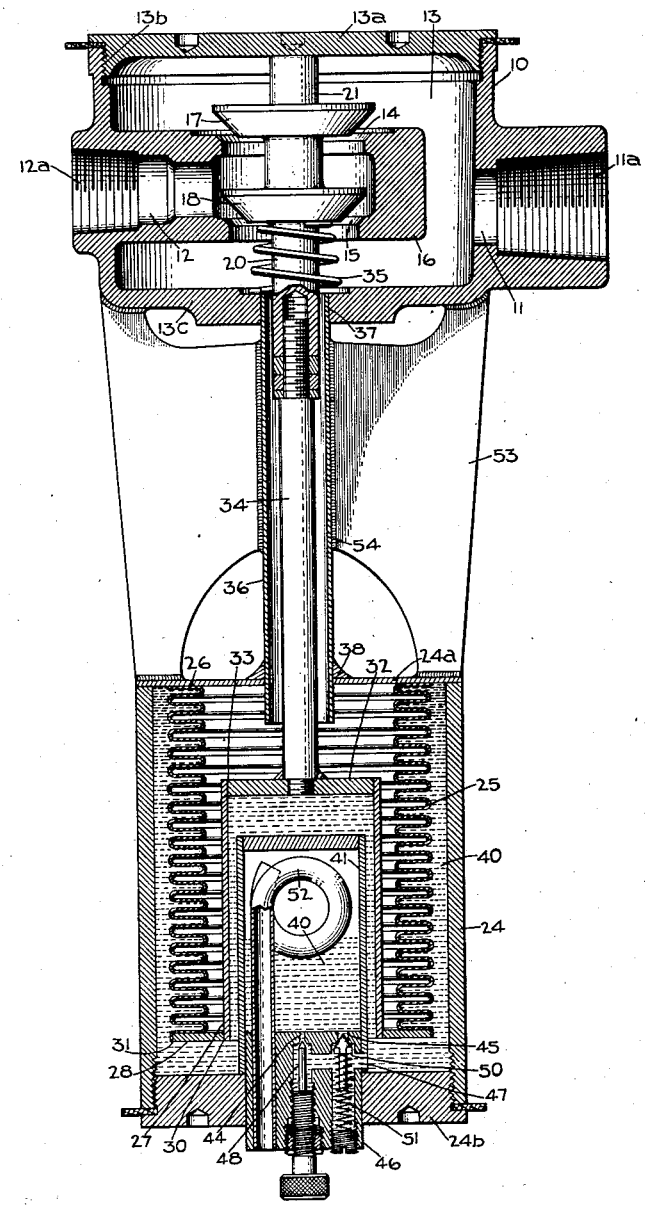
Inventor:
Jesse H. Clark,
by Charles E. Zullar
His Attorney.

Patented May 28, 1935

2,003,173

UNITED STATES PATENT OFFICE 2,003,173

FLUID VALVE

Jesse H. Clark, Cicero, Ill., assignor to Walker Dishwasher Corporation, Chicago, Ill., a corporation of Delaware Application March 14, 1933, Serial No. 660,682

4 Claims. (Cl. 221—101)

My invention relates to valves, more particularly to fluid metering or measuring valves, and it has for its object the provision of an improved device of this character which will accurately measure predetermined quantities of fluid.

An important application of my invention is in mechanical dishwashing apparatus and the like where it is important that the washing vat or chamber be supplied with a definite quantity of washing fluid in order that the most efficient cleansing action will be effected.

In dishwashing apparatus wherein a power operated impeller is employed to circulate the washing fluid in the vat, it is important that a definite measured quantity of water be provided, because it is a characteristic of an impeller of given shape and proportions when operating in a vat of given size and shape to operate most efficiently with a given quantity of washing fluid. If more or less washing fluid be provided, the impeller will operate less efficiently, with the result that the washing action as a whole will be less efficient.

Dishwashing apparatus of this character is frequently used in houses and dwellings, and the washing fluid is usually hot water supplied by the domestic hot water heating plant. While in some establishments the hot water heating system will provide water heated to a substantially uniform temperature, oftentimes the hot water provided varies between rather wide temperature limits.

It is because of this variation in the temperature of the washing water that the metering valves heretofore known do not function satisfactorily. The heat imparted by the water to the operating mechanisms of these valves impairs the accuracy of their operation, oftentimes to such an extent, that the valves will measure quite different quantities of water under different temperature conditions.

It is an important object of my invention to provide a metering valve which will measure quite accurately predetermined quantities of a fluid, irrespective of its temperature, or of fluids whose temperatures vary widely.

In carrying my invention into effect in one form thereof, I provide a suitable fluid motor for operating the valve, preferably in accordance with the pressure of the fluid flowing through the valve so that the valve is moved to close a predetermined interval of time after the flow has been started. Means are provided for thermally insulating the fluid motor from the controlled fluid so that the operation of the motor and hence that of the valve cannot be affected by the temperature of the fluid, irrespective of how low or how high it might be.

For a more complete understanding of my invention, reference should be had to the accompanying drawing, in which the single figure is a vertical sectional view of a metering valve embodying my invention.

Referring to the drawing, my invention is applied to a metering valve comprising a valve housing 10 provided with a fluid inlet passageway 11 and a fluid outlet passageway 12. These passageways, as shown, are in substantial alignment, but this particular arrangement is not necessary. The inlet and outlet passageways 11 and 12, as shown, are provided with threaded portions 11a and 12a respectively for receiving in threaded engagement suitable fluid conduits for conveying fluid to and from the valve. It will be understood that the inlet passageway 11 will be connected with a suitable source of fluid supply, whereas the outlet passageway 12 will be connected with the device or apparatus to which the fluid is to be supplied.

The inlet passageway 11 communicates with a chamber 13 in the valve housing 10, and this chamber in turn communicates with the outlet passageway 12 through a pair of vertically spaced aligned valve seats 14 and 15. These seats, as shown, are provided in a member 16 which in effect is an extension of the outlet passageway 12 inwardly of the chamber 13, and which may be and preferably is formed integrally with the walls of the housing 10. Preferably, the valve seats 14 and 15 will be arranged substantially in the vertical central axis of the chamber 13.

The chamber 13, as shown, is closed by a cover 13a which may have a threaded connection 13b with the walls of the chamber, or which may be secured to these walls in any other suitable manner.

The seats 14 and 15 are provided with cooperating valves 17 and 18 respectively. These valves are connected to a common operating stem 20. The valves 17 and 18 and the stem 20 may be and as shown are formed as an integral structure. Above the valve 17 is an abutment 21 arranged to contact the cover 13a of the chamber to limit the opening positions of the valves.

The valves are operated by means of a fluid motor which is thermally insulated from the valve housing 10 so that its operation is in no way affected by the temperature of the fluid flowing through the housing 10.

This motor comprises a housing 24 remotely situated with respect to the valve housing 10.

Within this housing is mounted a bellows-type motor 25 arranged to move when it expands and contracts in the line of movement of the valves 17 and 18.

This bellows motor is secured at its upper end to the upper wall 24a of the housing 24; a fluid-tight joint 26 is provided between these members. The bellows will preferably be formed of a rust resisting elastic metal, such as phosphor bronze or a suitable nickel alloy and may be connected with the wall 24a by welding or brazing.

Projecting into the bellows 25 through its lower end is a cylindrical-like member or chamber 27 which has its lower end connected with the lower end of the bellows by means of a flange-like member 28. This member has a fluid-tight joint 30 with the cylinder 27 and also a fluid-tight joint 31 with the bellows. These joints may be formed in any suitable manner, as by welding or brazing.

The cylinder 27, as shown, projects upwardly into the bellows for a considerable distance, but leaves a space between its upper end and the wall 24a sufficiently large to provide ample clearance between these members.

The upper end of the cylinder 27 is closed by a head 32 which has a fluid tight connection 33 with the cylinder. This head is mechanically connected with the valve stem 20 by means of a rod 34 which, as shown, has threaded connections both with the piston and with the valve rod. By reason of the above described arrangement of the bellows 25, the cylinder 27 and the rod 34, it will be observed that the bellows is rigidly connected with the valves 17 and 18, and that the latter will be moved relatively to their respective seats when the bellows is operated. The rod 34 should be made of a material having a relatively small coefficient of linear expansion.

Normally the bellows is in its contracted position, as shown, and when it is in this position the valves will be held in their open positions. If desired, a suitable compression spring 35 may be provided in the housing 10, beneath the valve 18 so as to bias the valves in their open positions and thereby assist the bellows. This spring will be sufficiently strong to counteract the combined weight of the valves, the valve rod 20, the abutment 21 and the rod 34.

The bellows is caused to be extended by the pressure of the fluid in the inlet passageway 11. For this purpose, a conduit 36 connects the bellows with the valve chamber 13. This conduit, as shown, surrounds the rod 34 and is connected at its upper end with the chamber 13 through the lower wall 13c of the valve housing, and at is lower end connects with the interior of the bellows through the wall 24a of the housing 24. Fluid tight joints 37 and 38 are provided between this conduit and the walls 13c and 24a respectively.

It will be understood that fluid in the chamber 13 will find its way downwardly through the tube 36 and into the bellows. The pressure of this fluid, of course, will extend the bellows, which operation will move the valves 17 and 18 toward their respective seats 14 and 15.

This extension of the bellows is retarded and controlled by means of a liquid 40 filling the chamber 24. The release for the liquid 40 from the liquid space in the chamber 24 is provided by means of a release cylinder or reservoir 41. This reservoir is supported by the bottom wall 24b of the chamber 24 and projects upwardly, as shown, into the cylinder 27. The upper end of the reservoir, however, is spaced somewhat from the head 32 so as to provide for movement of the head downwardly through the full extension stroke of the bellows motor.

The reservoir 41 communicates with the chamber 24 through a pair of relatively small ports 44 and 45. As shown, these ports are arranged in the bottom wall 46 provided for the reservoir, and both communicate with the chamber 24 by means of a transverse passageway 47 provided in the wall 46 and opening into the chamber 24.

Cooperating with the port 44 is a needle valve 48 which, as shown, is adjustably mounted in the wall 46 so that it can be moved to vary the size of the effective opening of the port 44. The port 45 is normally closed by means of a check valve 50, which, as shown, is biased to its closed position by means of a compression spring 51.

The upper end portion of the reservoir 41 is vented to the atmosphere through a vent tube 52.

Any suitable liquid 40 may be used, but preferably a liquid will be used whose viscosity is stable and whose expansion coefficient approaches zero, such as castor oil or glycerine.

Interposed between the valve housing 10 and the fluid motor housing 24 are a plurality of metallic heat dissipating fins 53. These fins, it will be observed, are spaced at intervals about the conduit member 36, and are connected with the conduit so as to be in intimate thermal relation with it by means of suitable joints 54, which may be brazed or soldered joints, or some other suitable joint effecting a very good thermal connection between the conduit and the fins. It will be observed that these fins contact the conduit 36 through a material portion of their length. They contact with the housing 10 and the housing 24, however, merely at their ends that is, through but a very small portion of the width, as clearly shown in the figure. By reason of the foregoing arrangement, any heat that is carried by the fluid within the tube will be dissipated to the atmosphere by the fins 53; practically none of this heat will flow to the fluid motor housing 24. It will be understood that the fins 53 will be formed from some suitable material having a relatively high heat conductivity, such as copper.

In the operation of the metering valve, it will be observed that when fluid is turned on to the inlet passageway 11 it will flow through the valve ports 14 and 15 to the outlet passageway 12. Under these conditions, the valves 17 and 18 will be balanced, that is, there will be no resultant pressure acting on the valves tending to move them either to their closed or to their open positions.

As pointed out previously, fluid will flow from the chamber 13 through the conduit 36 into the bellows 25. It will be understood that when fluid flows from the inlet 11 and through the outlet passageway 12 to the apparatus connected with it, there will be some back pressure set up in the outlet passageway, which pressure will find its way to the bellows 25 through the fluid medium which fills the tube 36 and the bellows. This pressure acting on the bellows will extend it. As the bellows expands in the chamber 24, some of the fluid 40 will be forced from the chamber 24 through the passageway 47, the port 44 and into the reservoir 41. The rate of expansion of the bellows, of course, will be determined by the magnitude of the pressure of the fluid acting on it and on the size of the effective opening of the port 44. It will be understood that the adjusting screw 48 will be set in accordance with the magnitude of the pressure acting on the bellows so as to determine the rate at which the valves 17 and 18 are closed, in other words, to determine the length of time that the valves are allowed to remain open after the fluid begins to flow through the valve. This length of time, of course, determines the quantity of fluid which will be allowed to flow through the device. If it be desired to shorten this period of time so as to measure a smaller quantity of fluid, the valve 48 will be screwed outwardly so as to enlarge the effective opening of the port 46, whereas if it be desired to extend this period of time to increase the quantity measured, the valve 48 will be operated to reduce the effective opening of the port 44.

Eventually, upon the expiration of a predetermined period of time after the flow of fluid was started, the bellows 25 will have been extended to such a degree that the valves 17 and 18 will have been operated to completely close their associated seats 14 and 15 and thereby shut off the flow of fluid through the valve.

The valves will remain closed as long as the fluid supply to the passageway 11 is maintained. When this supply is cut off, the pressure acting on the bellows 25 will be released, and as a result, the bellows will retract to its open valve position shown in the figure.

It will be observed that when the bellows contracts it will withdraw the fluid from the reservoir 41 which was previously forced into the reservoir by the expansion of the bellows. The relief valve 50 is provided to expedite this withdrawal of the fluid from the reservoir. It will be observed that this valve will open immediately when the bellows contracts so as to allow fluid to flow freely through the port 45 and into the chamber 24. The vent 52 is provided to prevent the building up of a pressure in the reservoir when the bellows 25 is expanding and forcing fluid into the reservoir.

By reason of the arrangement of the heat dissipating fins 53, it is practically impossible for any heat to flow from the controlled fluid medium passing through the valve chamber 10 to the motor chamber 24, irrespective of how high the temperature of this fluid may be. The fluid within the tube 36 and the bellows 25 will probably remain within these members after the initial operation of the device. It is very unlikely, therefore, that heat will flow from the fluid within the valve housing 10 far downwardly into the tube 34. However, any heat that does pass down into the tube will be dissipated immediately by the fins 53. The provision of the fins 53 is a very important feature of the invention because if heat could flow directly to the housing 24, the volume of the fluid 49 within the housing quite likely would be changed, and moreover, certain of the metallic parts of the mechanism would expand. It is clear that these conditions are undesirable because either or both likely would result in a change in the positions of the valves 17 and 18, and hence would vary the volume of fluid allowed to flow through the metering valve for a given adjustment of the device. Thus, for each different temperature of the controlled fluid, the setting of the device would change in a manner which could not be anticipated or controlled. The provision of the heat dissipating fins 53 overcomes this difficulty; it has been found that the metering device will accurately measure predetermined quantities of fluid, irrespective of its temperature.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent in the United States is:

1. A liquid metering device for measuring a predetermined quantity of liquid comprising a valve housing having inlet and outlet liquid passageways, a valve in said housing controlling the flow of liquid through said housing from said inlet to said outlet passageway, an expansible member for operating said valve remotely situated with respect to said housing, a valve rod connecting said valve with said expansible member, a fluid passageway connecting said inlet passageway with said expansible member so that when liquid is flowing through said housing the pressure of the liquid in said valve housing is applied through said passageway to said expansible member to operate said valve to its closed position, means controlling the operation of said expansible member so that said valve is operated to close at a predetermined rate in response to the pressure of the liquid flowing through said housing, whereby a predetermined quantity of liquid is permitted to flow through said housing while said valve is being closed and heat dissipating members between said valve housing and said expansible member and said controlling means arranged to prevent a material transfer of heat from said housing to said latter members, whereby said members operate substantially uninfluenced by the temperature of the liquid flowing through said housing.

2. A liquid metering device for measuring a predetermined quantity of liquid comprising a valve housing provided with liquid inlet and outlet passageways and a valve seat between said passageways, a valve cooperating with said seat, a housing removed from said valve housing, a closed bellows within said second housing, means connecting said bellows with said valve so that said valve is operated between its opened and closed positions by operation of said bellows, said bellows being arranged to normally hold said valve in its open position, a fluid conduit between the interior of said bellows and said inlet passageway so that when liquid flows into said inlet passageway it will flow into said bellows to operate said bellows to move said valve to its closed position, a liquid within said bellows housing surrounding said bellows so as to resist its movement to close said valve, a release chamber, means for releasing the liquid surrounding said bellows to said release chamber at a predetermined rate so as to time the movement of said valve to close at a predetermined rate and thereby permit a predetermined quantity of fluid to flow through said valve while said valve is closing, and heat dissipating fins in thermal relation with said fluid conduit between said valve housing and said bellows.

3. A fluid metering valve comprising a valve housing provided with fluid inlet and outlet passageways and a valve seat between said passageways, a valve cooperating with said seat, a housing removed from said valve housing, a metallic bellows-type motor in said housing, means connecting said bellows-type motor with the stem of said valve so that movement of said valve between its open and closed positions is controlled by movement of said bellows-type motor, said bellows-type motor normally contracted to hold said valve open, a conduit connecting the interior of said bellows-type motor with the inlet passageway of said valve housing so that said bellows-type motor is extended to close said valve by fluid pressure in said valve housing, said bellows-type motor being otherwise closed to its housing, a fluid in said motor housing filling the space about said bellows-type motor and resisting the extension thereof, a relief reservoir for said fluid, means controlling the flow of fluid from said motor housing to said reservoir to control the rate of extension of said bellows-type motor and thereby the rate of closure of said valve, heat dissipating metallic fins spaced at intervals about said fluid conduit conveying fluid to said bellows-type motor, and a check valve between said reservoir and said motor housing providing for quick return of liquid from said reservoir to said motor housing when said bellows-type motor contracts.

4. A fluid metering device comprising a valve housing, a valve in said housing controlling the flow of fluid through said housing, an expansible bellows connected to said valve to operate it between its open and closed positions, a fluid passageway between said housing and said bellows through which the pressure of the fluid in said housing is applied to said bellows to operate it to operate said valve, a chamber surrounding said bellows, a liquid in said chamber opposing the operation of said bellows by said fluid pressure, a pressure release chamber in fluid communication with said first mentioned chamber and adjustable means controlling the release of liquid from said first chamber to said release chamber to adjust the rate of flow of said liquid and thereby the rate at which said valve is operated by said bellows.

JESSE H. CLARK.